Oct. 11, 1932.                M. C. MEAGHER                1,882,290
                              FROZEN CONFECTION
                              Filed Feb. 28, 1929
Fig. 1.                                        Fig. 2.
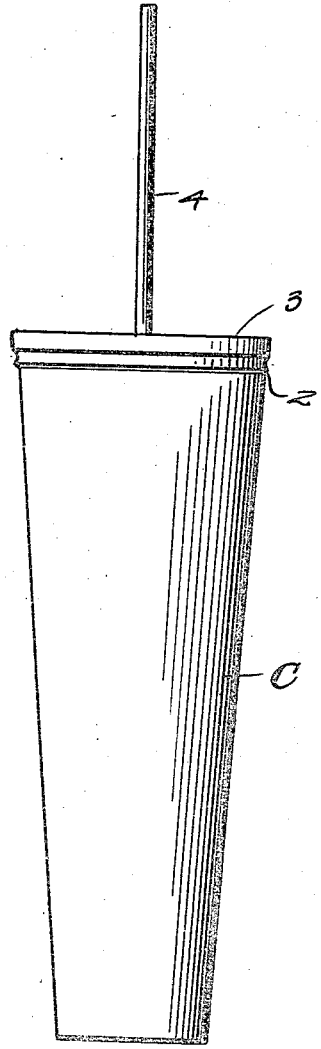
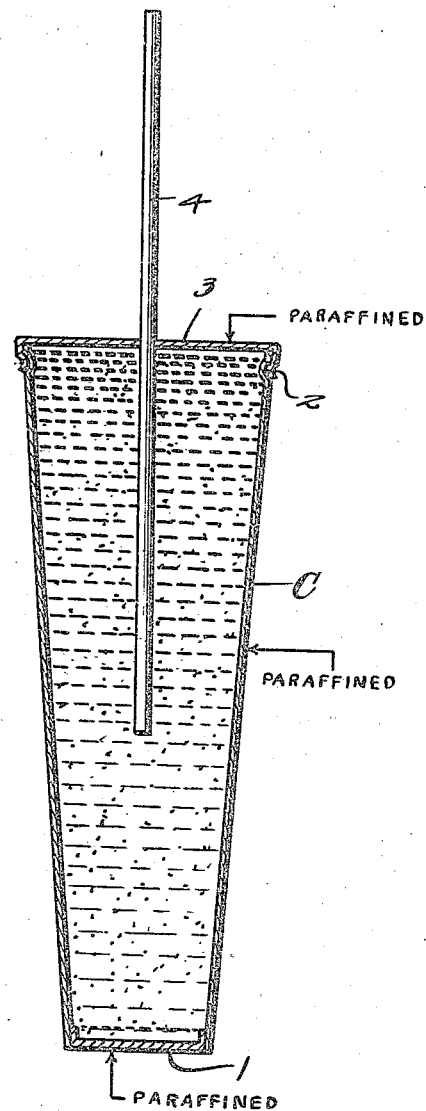
Inventor
M. C. Meagher Patented Oct. 11, 1932

1,882,290

UNITED STATES PATENT OFFICE

MATTHEW C. MEAGHER, OF BETHLEHEM, PENNSYLVANIA

FROZEN CONFECTION

Application filed February 28, 1929. Serial No. 343,381.

This invention relates to a frozen confection and it is an object of the invention to provide a confection of this kind which employs a normally liquid carbonated material which, when frozen, is of a crystalline character and spongy due to the gas retained in the material when frozen.

The invention also has for an object to provide a novel method whereby the frozen confection may be readily and conveniently produced.

In the manufacture, dispensation and consumption of such confections it is obviously a matter of considerable importance from a hygienic and sanitary viewpoint that the confection be handled as little as possible with the hands or fingers, since aside from the uncleanliness of such manipulation there is always a possibility of dangerous infection of the food. With this thought in mind a novel method is evolved which entirely obviates any necessity for touching the edible element of the confection with the fingers, either during the process of making, or while being handled by the dealer, or eaten by the consumer.

To this end the edible substance is frozen in a container while hermetically sealed therein by a cap closing an end of the container, there being a stick passed centrally through the cap and immersed in the edible substance. As the edible substance is solidified by freezing it bonds to both the stick and the cap by congelation and hence the cap may serve as a guard preventing the fingers from touching the edible when withdrawn from the container and when the stick is being used as a handle during the dispensation of the confection and the consumption of the edible portion thereof.

The novel features of my invention will hereinafter be definitely claimed.

In order that my invention may be the better understood, I will now proceed to describe the same with reference to the accompanying drawing, wherein:—

Figure 1 is a view in elevation of a frozen confection constructed in accordance with an embodiment of my invention;

Figure 2 is a vertical sectional view taken through the device as illustrated in Figure 1 with the stick in elevation.

My improved confection comprises a carbonated normally liquid material flavored as desired by syrup or pure fruit juice. This normally liquid material promptly upon being mixed is poured within a container C of desired configuration, preferably gradually decreasing in diameter from one end toward the other. The smaller end of the container C is closed by a flanged cap 1 which is snugly engaged within the container C. The opposite or larger end portion of the container C has formed therearound a groove 2 into which is adapted to be pressed the marginal portion of a cap 3 whereby the cap 3 will be applied to the container C in an airtight manner and thus avoiding escape of the carbondioxide gas in the mixture poured within the container C. The wall of the container C together with the caps 1 and 3 preferably comprise wax paper of desired strength.

The cap 3 has disposed through the central portion thereof an elongated stick 4, the location of the cap 3 upon the stick 4 being such that when the cap 3 is in applied position with respect to the container C the stick 4 will extend a material distance within the material in the container C.

The filled and sealed container C is subjected to requisite refrigeration until the normally liquid material becomes frozen or solidified. The freezing of the material within the container C results in retention of the gas therein, thus providing a frozen product that is crystalline and somewhat spongy affording a frozen confection which is highly palatable and which can be readily eaten.

In the finished product the caps 1 and 3 coact with the container C to effectively seal the container against escape therefrom of the carbonated gas which will have a tendency to separate itself from the content of the container. When the confection is to be eaten slight pull is imposed upon the extended portion of the stick 4 and pressure upon the cap 1 causing the frozen content to readily pass out from within the container C. This operation also forces the cap 3 out with the confection, thus permitting the cap 3 to serve as a guard to prevent contact with the frozen material of the fingers of a hand grasping the extended portion of the stick 4 which serves as a handle. By imposing pressure upon the cap 1 the same is displaced with respect to the container C and thereby preventing the container being again used.

It is to be understood that this application is a continuation in part of my pending application Serial No. 178,751 filed March 26, 1927.

I claim:—

1. As a new article of manufacture, a frozen confection comprising a core of carbonated normally liquid material, a paper container in which said core is engaged, one end of the container being open, an elongated stick extending within an end portion of the core through the open end of the container, a cap carried by the stick and sealing the open end of the container, and a cap closing the opposite end of the container and adapted to be forced inwardly thereof to remove the core from the container.

2. As a new article of manufacture, a frozen confection comprising a core of carbonated normally liquid material, a paper container in which said core is engaged, one end of the container being open, an elongated stick extending within an end portion of the core through the open end of the container, a cap carried by the stick and sealing the open end of the container, and a cap closing the opposite end of the container and adapted to be forced inwardly thereof to remove the core from the container, said open end portion of the container being provided therearound with a groove to receive the marginal portions of the applied cap.

3. That process of preparing and dispensing a frozen confection in sanitary condition which consists in providing a container of paper-like material, placing in the container in a liquid form a quantity of the confection to be dispensed, capping the container with a cap having a stick extending therethrough and projecting into the liquid in the container, placing the whole in a freezer and retaining it therein until the liquid is completely frozen and adherent to the stick, withdrawing the entire package thus formed, and dispensing the package in its entirety with the container in position on the frozen liquid and the stick in position relative to the confection and container.

4. That process of preparing and dispensing a frozen confection in sanitary condition which consists in providing a container of paper-like material, open at one end and closed at its other end with a cap fitted within the container and movable longitudinally thereof, placing in the container in a liquid form a quantity of the confection to be dispensed, capping the container with a cap having a stick extending therethrough and projecting into the liquid in the container, placing the whole in a freezer and retaining it therein until the liquid is completely frozen and adherent to the stick, withdrawing the entire package thus formed, and dispensing the package in its entirety with the container in position on the frozen liquid and the stick in position relative to the confection and container.

5. A process of preparing and dispensing a frozen confection in sanitary condition which consists in providing a container of paper-like material; said container being opened at one end and closed at its other end with a cap; said cap adapted to be moved longitudinally in said container upon pressure being exerted thereon; placing in the container a quantity of confection in a liquid form; capping the container; placing the container with contents therein in a freezer and retaining it therein until the liquid becomes frozen, and dispensing the package in its entirety with the container in position on the frozen content as a wrapper.

6. A frozen confection comprising a frusto conical core of frozen material, a frusto conical water proof container surrounding said core and including a closure for the smaller end of the container arranged to lie within said smaller end whereby it may be pushed toward the larger end of the container, a removable closure for the outer end of the container having a central opening therein and surrounded by a flange, and a rod projecting from the frozen confection through said smaller opening.

In testimony whereof I hereunto affix my signature.

MATTHEW C. MEAGHER.